United States Patent [19]

Takao et al.

[11] Patent Number: 4,812,527

[45] Date of Patent: Mar. 14, 1989

[54] RUBBER COMPOSITION FOR TIRE TREADS CONTAINING DICARBOXYLIC ACID DIESTER COUPLED BLOCK POLYMERS

[75] Inventors: Hiroyoshi Takao, Chiba; Nabuyuki Yoshida, Ichihara; Akio Imai, Ichihara; Mitsuji Tsuji, Ichihara; Yuichi Saito, Kobe, all of Japan

[73] Assignees: Sumitomo Chemical Company, Limited, Osaka; Sumitomo Rubber Industries, Ltd., Kobe, both of Japan

[21] Appl. No.: 112,989

[22] Filed: Oct. 27, 1987

[30] Foreign Application Priority Data

Oct. 30, 1986 [JP] Japan .................................. 61-258899

[51] Int. Cl.$^4$ ............................................ C08F 297/04
[52] U.S. Cl. .................................. 525/250; 152/209 R; 525/99; 525/262; 525/314
[58] Field of Search ........................... 525/250, 314

[56] References Cited

U.S. PATENT DOCUMENTS

| | | | |
|---|---|---|---|
| 4,482,678 | 11/1984 | Furukawa et al. | 525/236 |
| 4,523,618 | 6/1985 | Yamamoto et al. | 152/209 |
| 4,575,534 | 3/1986 | Oshima et al. | 525/314 |

FOREIGN PATENT DOCUMENTS

| | | | |
|---|---|---|---|
| 0054440 | 6/1982 | European Pat. Off. | 525/314 |
| 57-100149 | 6/1982 | Japan . | |
| 57-102912 | 6/1982 | Japan . | |
| 57-109817 | 7/1982 | Japan . | |
| 57-109818 | 7/1982 | Japan . | |
| 57-108142 | 7/1982 | Japan . | |
| 57-200439 | 12/1982 | Japan . | |
| 58-93709 | 6/1983 | Japan . | |
| 60-192739 | 10/1985 | Japan . | |

*Primary Examiner*—Wilbert J. Briggs, Sr.
*Attorney, Agent, or Firm*—Armstrong, Nikaido, Marmelstein & Kubovcik

[57] ABSTRACT

A rubber composition suitable for tire treads having well-balanced excellent wet skid characteristic, ice skid characteristic and rolling characteristic, and an excellent processability, which comprises a rubber component containing at least 20% by weight of a block copolymer consisting essentially of a block A and a block B, obtained by conducting polymerization of an aromatic vinyl compound and a conjugated diene compound in a hydrocarbon solvent in the presence of an organolithium initiator and modifying with a coupling agent, and satisfying the following conditions (A) to (E);

(A) the block A having a content of an aromatic vinyl compound of at most 5% by weight and a content of 1,2-bonds in the conjugated diene component of at least 10% by weight, (B) the block B having a content of an aromatic vinyl compound of 25 to 50% by weight and a content of 1,2-bonds in the conjugated diene component of at least 10% by weight, (C) a content of the block A in the block copolymer being from 20 to 80% by weight, (D) a content of the aromatic vinyl compound in the block copolymer being from 5 to 30% by weight and a content of 1,2-bonds in the conjugated diene component of the block copolymer being from 20 to 60% by weight, and (E) at least 40% by weight of the polymer chains of the block copolymer being a branched polymer formed by modification with a dicarboxylic acid diester.

5 Claims, No Drawings

RUBBER COMPOSITION FOR TIRE TREADS CONTAINING DICARBOXYLIC ACID DIESTER COUPLED BLOCK POLYMERS

BACKGROUND OF THE INVENTION

The present invention relates to a rubber composition suitable for use in treads of automobile tires, and more particularly to a rubber composition for use in treads of tires of low fuel cost having excellent wet skid characteristic, excellent rolling resistance characteristic and excellent skid characteristic on ice-snow road (hereinafter referred to as "ice skid characteristic").

In recent years, the reduction of running fuel cost of automobiles has been in strong demand increasingly, paritcularly it is of urgent demand to improve characteristics of tires, because it has an important influence on fuel saving.

The characteristics required for tires are principally wear resistance, wet skid characteristic, low heat generation, bending resistance, chipping resistance and groove cracking resistance, and they must be well balanced. Especially, from the viewpoint of resources and energy saving, it is important that energy loss and rolling resistance are low.

Among these characteristics, a high wet skid characteristic for steering stability and a low rolling resistance for fuel saving are particularly important, but the both characteristics have been recognized as contrary to each other from the conventional knowledge.

The present inventors, while continuing the fundamental study of the rolling and wet skid characteristics which have been hitherto considered as antinomic, made a study of the structure and polymerization process of polymers having an excellent processability practically required in tire manufacturing such as kneading processability, roll processability and extrusion processability, and they found, as described in U.S. Pat. No. 4,523,618, that a branched polymer having a particular structure has a high wet skid characteristic and an excellent rolling resistance together with an excellent processability.

Also, rubber compositions suitable for use in the treads of low fuel cost tires are similarly proposed by the present inventors, for instance, in Japanese Unexamined Patent Publication Nos. 4633/1984 and 4634/1984 and U.S. Pat. No. 4,482,678. These compositions contain as a main rubber component a copolymer of a vinyl aromatic compound and butadiene having a particular structure and a particular molecular weight distribution, and they have both a high wet skid characteristic and an excellent rolling resistance characteristic and furhter excellent processability and excellent practical moldability required in molding of tires.

Also, in recent years, since the public nuisance of dust particles due to the spike tires in a cold district is highlighted and since exchanging summer tires with snow or spike tires is awkward, tires available throughout the year without exchanging is strongly demanded.

A tread rubber used in these tires requires an excellent ice skid characteristic in addition to a high wet skid characteristic and a low rolling resistance. In order to improve the skid characteristic on ice-snow road, it is known hitherto that a rubber hardness at a low temperature must be reduced, but it is difficult to satisfy these characteristics at the same time.

For instance, in a rubber composition mainly composed of an emulsion-polymerized SBR, a good wet skid characteristic may be obtained, but an energy loss is high and a rolling resistance characteristic is poor, besides an ice skid characteristic is also not sufficient.

Also, a rubber composition using rubber components having a low glass transition temperature (Tg) such as natural rubber, polyisoprene rubber, high-cis-1,4-polybutadiene rubber and the like, has superior rolling resistance characteristic and ice skid characteristic, but is poor in wet skid characteristic.

Further, though the compositions of the aforementioned Japanese Unexamined Patent Publication Nos. 4633/1984 and 4634/1984, U.S. Pat. Nos. 4,523,618 and 4,482,678 have a high wet skid characteristic together with an excellent rolling resistance characteristic, the rubber hardness increases rapidly at a low temperature due to its relatively high Tg, thus the ice skid characteristic is far from the satisfied level.

Various rubber compositions are also proposed by other persons. For instance, in Japanese Unexamined Patent Publication Nos. 102912/1982 and 108142/1982, there are disclosed rubber compositions containing a rubber which is a styrene-butadiene copolymer prepared using an organolithium initiator and having two blocks with different bound styrene contents and vinyl contents in butadiene component. The copolymers disclosed in these publications are linear polymers. The compositions have well-balanced wet skid characteristic and rolling resistance characteristic, but the ice skid characteristic is not in a satisfactory level.

In Japanese Unexamined Patent Publication Nos. 165445/1982, 200439/1982 and 192739/1985, a rubber composition containing a branched styrene-butadiene block copolymer having two different blocks is disclosed. A relatively good ice skid characteristic is achieved, but a level required in practical use is still not satisfied.

Also, though it has been attempted to blend different kinds of polymers together so as to possibly harmonize the aforementioned characteristics which are conflicting with each other, it is the present situation that the demanded performance is not still satisfied and further improvements are strongly demanded in the industry, setting aside some improvements being made to a certain extent.

In view of the present situation, the present invention is intended to improve drawbacks of conventional rubber compositions for use in the tread of tires, in which a satisfactory level is not achieved in an ice skid characteristic.

Accordingly, it is an object of the present invention to provide a rubber composition suitable for use in the tread of low fuel cost tires, in which wet skid characteristic, rolling resistance characteristic and ice skid characteristic are totally improved and moreover which has an excellent processability.

SUMMARY OF THE INVENTION

The present inventors have studied in order to further improve wet skid characteristic, rolling resistance characteristic and ice skid characteristic with respect to a copolymer of an aromatic vinyl compound and a conjugated diene compound prepared by using an organolithium initiator in a hydrocarbon solvent, and have now found that these characteristics can be improved totally and moreover an excellent processability is obtained, when a branched block copolymer which consists of two blocks having specific contents of an aromatic vinyl compound and specific contents of 1,2-bonds in the conjugated diene portions and in which more than predetermined proportion of the polymer chains are modified with a specific coupling agent, is used as the rubber component of rubber compositions.

In accordance with the present invention, there is provided a rubber composition comprising a rubber component containing at least 20% by weight of a block copolymer, said block copolymer being a branched block copolymer consisting essentially of a block A and a block B, obtained by copolymerization of an aromatic vinyl compound and a conjugated diene compound in the presence of an organolithium initiator in a hydrocarbon solvent and having the following conditions (A) to (E);

(A) the block A is a block of a polymer of which the content of the aromatic vinyl compound is not more than 5% by weight and the 1,2-bonding content in the conjugated diene component is not less than 10% by weight, (B) the block B is a block of a copolymer of which the content of the aromatic vinyl compound is from 25 to 50% by weight and the 1,2-bonding content in the conjugated diene component is not less than 10% by weight;

(C) the content of block A is from 20 to 80% by weight;

(D) the average content of the aromatic vinyl compound is from 5 to 30% by weight and the average 1,2-bonding content in the conjugated diene component is from 20 to 60% by weight; and (E) at least 40% by weight of the whole polymer chains is modified with a dicarboxylic acid diester.

The rubber composition of the present invention, as compared with the rubber compositions disclosed in Japanese Unexamined Patent Publication Nos. 102912/1982, 108142/1982, 165445/1982, 200439/1982 and 192739/1985, is different in limited conditions in the structure of block copolymer or the modifier used. Consequently, it is superior in a total balance between rolling resistance, ice skid characteristic and wet skid characteristic.

These excellent characteristics in the present invention are achieved by the use of the block copolymer having the specific structure such that two blocks A and B have different contents of the aromatic vinyl compound, namely not more than 5% by weight in block A and 25 to 50% by weight in block B, and at least 40% by weight of the polymer chains are coupled with a dicarboxylic acid diester.

DETAILED DESCRIPTION

In the block copolymer of the present invention, it is important that (A) the content of the aromatic vinyl compound in the block A is not more than 5% by weight and the content of 1,2-bonds in the conjugated diene component is not less than 10% by weight, and (B) the content of the aromatic vinyl compound in the block B is within the range of 25 to 50% by weight and the content of 1,2-bonds in the conjugated diene component is not less than 10% by weight.

When the content of the aromatic vinyl compound in the block A is more than 5% by weight, the ice skid characteristic is poor. Preferebly, the block A is a homopolymer of a conjugated diene.

Also, when the content of the aromatic vinyl compound in the block B is less than 25% by weight, the wet skid characteristic is poor, and when the content is more than 50% by weight, the ice skid characteristic is poor. Preferably, the content of the aromatic vinyl compound in the block B is from 30 to 45% by weight.

In each of the blocks A and B, the 1,2-bonding content in the conjugated diene component is at least 10% by weight. It is industrially difficult to decrease the 1,2-bonding content to below 10% by weight. Preferably, the 1,2-bonding content in each block is from 10 to 60% by weight.

In the block copolymer of the present invention, (C) the content of block A is from 20 to 80% by weight, preferably from 40 to 80% by weight. Characteristics intended by the present invention are not obtainable outside this range.

In the block copolymer of the present invention, (D) the aromatic vinyl compound content of the block copolymer as a whole is from 5 to 30% by weight, preferably from 10 to 25% by weight. If the average aromatic vinyl compound content in the block copolymer is less than 5% by weight, the wet skid characteristic is lowered, and if it exceeds 30% by weight, the rolling resistance characteristic and ice skid characteristic are lowered.

Also, the 1,2-bonding content in the conjugated diene component of the copolymer as a whole is from 20 to 60% by wight, preferably from 25 to 50% by weight. Diviation from this range deteriorates the balance between the wet skid characteristic and rolling resistance characteristic.

Further, it is essential that (E) the block copolymer used in the present invention is a branched polymer in which at least 40% by weight of the whole polymer chains are those modified with a dicarboxylic acid diester as a coupling agent.

Compounds having two ester bonds in the molecule known effective as the coupling agent can be used in the present invention. Preferable dicarboxylic acid diesters include, for instance, dimethyl adipate, diethyl adipate, di-n-butyl adipate, dimethyl maleate, diethyl maleate, di-n-buthyl maleate and di-n-dioctyl maleate. The diesters may be used alone or in admixture thereof.

Well-balanced ice skid characteristic, wet skid characteristic and rolling resistance characteristic which are intended in the present invention, are hard to obtain by using well known other coupling agents, e.g. a halogen compound such as silicon tetrachloride or tin tetrachloride, and a compound having a plurality of vinyl groups.

It is also important that (E) the content of the modified polymer chains in the whole polymer chains is at least 40% by weight. When the content is less than 40% by weight, the roll processability in kneading of compounded rubber is poor, and also a balance between the ice skid characteristic and the wet skid characteristic becomes bad.

The content of the polymer chains modified by the coupling agent can be controlled by the ratio of the amounts of the living polymer ends and the dicarboxylic acid diester. The content can be determined from the molecular weight distribution of the block copolymer measured by a gel permeation chromatograph (GPC). That is to say, the weight ratio of the modified polymer chains and the unmodified polymer chains can be defined by the relative ratio of the heights of the peaks corresponding to the respective average molecular weights of the modified and unmodified polymer chains.

The block copolymer of the present invention is prepared, for instance, by a process using an organic alkali metal compound as an initiator known as a living anionic polymerization. Particularly, the process using an organolithium compound as a polymerization initiator, a Lewis basic compound such as ethers or tertiary amines as an agent for controlling the microstructure, namely 1,2-bonding content in the conjugated diene portion, and an inert hydrocarbon compound as a polymerization solvent, is preferred from the viewpoint of polymerization stability and controllability.

The block copolymer of the present invention can be prepared, for instance, in such a manner as after first polymerization of the block A or B, changing the polymerization temperature or adjusting the amount of the microstructure control agent and then conducting polymerization for the other block.

Examples of the aromatic vinyl compound employed for preparing the block copolymer of the present invention are, for instance, styrene, styrene derivatives having a substituent on the benzene nucleus, e.g. m-methylstyrene, p-methylstyrene and p-tertiarybutylstyrene, and styrene derivatives having a substituent on the vinyl group, e.g. α-methylstyrene. The aromatic vinyl compounds may be used alone or in admixture thereof. From the viewpoint of obtainability, styrene and p-methylstyrne are preferably selected, and more preferably, styrene is selected.

Examples of the conjugated diene compound are, for instance, 1,3-butadiene, isoprene, piperylene and substituted butadienes such as 2,3-dimethyl-1,3-butadiene and 1-phenyl-1,3-butadiene, 1,3-pentadiene and its substituted derivatives, and the like. The diene compounds may be used alone or in admixture thereof. Particularly, 1,3-butadiene or isoprene is preferably employed, because of easiness in obtaining the monomer and high polymerization rate in the production on an industrial scale.

In the preparation of the block copolymer of the present invention, aromatic hydrocarbons such as benzene, toluene, xylene and ethylbenzene, aliphatic hydrocarbons such as hexane and heptane, and alicyclic hydrocarbons such as cyclopentane, cyclohexane and methylcyclohexane are preferably employed as an inert polymerization solvent or diluent from the viewpoint of control of the polymerization reaction. These hydrocarbons may be employed alone or in admixture thereof. They are preferably used in an amount of 100 to 2000 parts by weight per 100 parts by weight of the whole monomers used.

With regards to these solvents and the above-mentioned monomers, it is necessary to previously, sufficiently remove therefrom substances which destroy the initiator or the active ends, e.g. water, oxygen, carbon dioxide, certain kinds of sulfur compounds, and acetylene compounds.

Preferable organolithium compounds used for preparing the block copolymer in the present invention are those known usually as anionic polymerization initiators of one end initiation type or both ends initiation type. Representative examples are, for instance, ethyllithium, propyllithium, butyllithium, amyllithium, trimethylenedilithium, tetramethylenedilithium, hexyllithium, cyclohexyllithium, phenyllithium, tolyllithium, naphthyllithium, lithium complexes of condensed or noncondensed aromatic rings, oligobutadienyldilithium and oligoisobutyleneyldilithium which are in the living state, and the like. These organolithium compounds may be employed alone or in admixture thereof.

As Lewis basic compounds used for the preparation of the block copolymer of the present invention, various kinds of compounds can be employed, but ether compounds and tertiary amines are particularly preferred because of being easily obtainable in the industrial scale. Examples of the ether compounds are, for instance, cyclic ethers such as tetrahydrofuran, tetrahydropyran and 1,4-dioxane; aliphatic monoethers such as diethyl ether and dibutyl ether; aliphatic polyethers such as ethyleneglycoldimethyl ether, ethyleneglycoldiethyl ether, ethyleneglycoldibutyl ether, diethyleneglycoldiethyl ether and diethyleneglycoldibutyl ether; aromatic ethers such as diphenyl ether and anisole, and the like. Examples of the tertiary amine compounds are, for instance, triethylamine, tripropylamine, tributylamine, and other compounds such as N,N,N',N'-tetramethylethylenediamine, N,N-diethylaniline, pyridine and quinoline, and the like.

The content of 1,2-bonds in the block copolymer can be controlled by adjusting the ratio of the Lewis basic compound and the polymerization initiator, and the polymerization temperature. The content of 1,2-bonds is increased with increasing the proportion of the Lewis basic compound and with lowering the polymerization temperature.

The polymerization temperature is preferably from 0° to 150° C. from the viewpoint of the economy and side reaction, though it can be changed according to the microstructure desired.

In the present invention, the molar ratio of the coupling agent to the living polymer end should be controlled in order to obtain the block copolymer containing the modified polymer chains in the desired proportion. Usually, the coupling agent is used in an amount of at least 0.1 mole per mole of the living polymer ends.

It is preferable that the Mooney viscosity at 100° C. ($ML_{1+4}$, 100° C.) of the block copolymer of the present invention is from 20 to 150. When the Mooney viscosity is less than 20, the rolling resistance increases, and when more than 150, the processability is poor.

The block copolymer can be used alone as the rubber component or in the form of a blend with other rubbers.

The rubber component used in the rubber composition in accordance with the present invention must contain at least 20% by weight of the above-mentioned block copolymer. When the content of the block copolymer in the rubber component is less than 20% by weight, the wet skid resistance characteristic and the ice skid resistance characteristic are poor. Preferably, the content in the rubber component is from 40% to less than 90% by weight.

Although polymers which may be blended as the rubber component with the block copolymer are preferably natural rubber, synthetic isoprene rubber and high cis-butadiene rubber, an emulsion-polymerized SBR (e.g., an SBR having a styrene content of 23.57% by weight and a vinyl content of 18.7% by weight) may be also employed. The content of these polymers in the rubber component is less than 80% by weight, preferably from 10 to less than 60% by weight. It is not preferable to use beyond 80% by weight, because in case of natural rubber, synthetic polyisoprene rubber and high cis-butadiene rubber, the wet skid characteristic lowers, and in case of an emulsion SBR, the ice skid characteristic lowers. On the other hand, it is preferable to use these polymers in an amount of not less than 10% by weight, because the tackiness is increased and the inconvenient phenomenon such as demold splitting can be avoided in molding the composition into tires.

The rubber composition in accordance with the present invention shows an excellent wet skid characteristic, an excellent ice skid characteristic and a low rolling resistance as a result of using the block copolymer as mentioned above. In order to exhibit these characteristics and also to maintain a breaking resistance as obtained in a conventional composition for tires, the composition of the present invention may be incorporated with, as process oil, an oil having a flow point of 0° to less than 30° C. in an amount of not less than 5 parts by weight to less than 25 parts by weight per 100 parts by weight of the rubber component.

As such an oil, an oil having a high aromatic compound content, namely a so-called aromatic oil, is preferably used. It is not preferable to use an oil having a flow point above 30° C., because the ice skid characteristic lowers, and also the viscosity of the composition increases, thus resulting in poor operability in handling. On the other hand, when the flow point is less than 0° C., the wet skid characteristic lowers, and also the breaking strength and the maximum elongation at breaking of the cured composition are lowered.

The rubber composition of the present invention may contain usual other rubber additives, e.g. carbon black, wax, age registor, curing agent, curing assistant and curing accelerator.

The composition of the present invention can be cured in a usual manner usually at a temperature of 140° to 190° C.

The present invention is more specifically described and explained by means of the following Examples in which all percents and parts are by weight unless otherwise noted. It is to be understood that the present invention is not limited to the Examples, and various changes and modification may be made in the invention without departing from the spirit and scope thereof.

EXAMPLES 1 to 8 AND COMPARATIVE EXAMPLES 1 to 7

SYNTHESIS OF POLYMERS A TO F (EXAMPLES) AND POLYMERS G TO L (COMPARATIVE EXAMPLES)

The air in a 20 liter autoclave equipped with a stirrer and a jacket was replaced with nitrogen gas, and the autoclave was charged with 10 kg of purified and dried n-hexane (or cyclohexane) and prescribed amounts of styrene, butadiene and tetrahydrofuran as a microstructure modifier. As a polymerization initiator, n-butyllithium dissolved in n-hexane was then added, and hot water was circulated in the jacket of the autoclave to start the polymerization at the prescribed temperature for producing the block A of the block copolymer as shown in Table 1.

After attaining the polymerization conversion of not less than 99%, prescribed amounts of styrene, butadiene and a microstructure modifier were further fed to the autoclave, and the polymerization was further continued at the prescribed temperature to form the block B of the block copolymer as shown in Table 1.

After the completion of the polymerization, a prescribed amount of the coupling agent shown in Table 1 was added to the autoclave and the reaction was conducted for 30 minutes.

After adding 2,6-di-tertial-butyl-p-cresol (Sumilizer ®-BHT made by Sumitomo Chemical Co., Ltd.) to the final reaction mixture in an amount of 1.0 part per 100 parts of the copolymer, the reaction mixture was poured into hot water and the solvent was distilled away. The precipitated polymer was dried under reduced pressure. The properties of the polymer were measured and the results are shown in Table 1. The measurement was made under the following conditions.

(1) Styrene content and 1,2-bond content in conjugated diene component

These contents were calculated from the ratio of the intensities of characteristic absorptions measured using an infrared spectrophotometer made by Japan Spectroscopic Co., Ltd.

(2) Branched polymer Content

A gel permeation chromatograph HLC-802UR made by Toyo Soda Co., Ltd. was used and columns of $10^3$, $10^4$, $10^6$ and $10^7$ were selected as the distribution column. A refractometer was used as a detector. The molecular weight distribution of a polymer was measured at 40° C. by using tetrahydrofuran (THF) as a developing solvent. The relative ratio of the hights of the peaks corresponding to the average molecular weights of the branched and unbranched polymers is defined as the weight ratio of the respective polymers.

TABLE 1

| | Polymer | | | | | |
|---|---|---|---|---|---|---|
| | A Example | B Example | C Example | D Example | E Example | F Example |
| Polymerization Conditions | | | | | | |
| Solvent (kg) | n-Hexane 10 | n-Hexane 10 | Cyclohexane 10 | Cyclohexane 10 | n-Hexane 10 | Cyclohexane 10 |
| A Block | | | | | | |
| Butadiene (kg) | 1.44 | 0.98 | 1.3 | 1.5 | 1.3 | 1.0 |
| Styrene (kg) | 0.06 | 0.02 | 0 | 0 | 0 | 0 |
| Microstructure modifier (g) | THF*1 9.7 | THF 9.0 | THF 16.5 | THF 18.5 | THF 18.5 | THF 3.5 |
| n-BuLi*2 (mmol) | 10.0 | 11.5 | 9.8 | 10.8 | 12.7 | 13.0 |
| B Block | | | | | | |
| Butadiene (kg) | 0.32 | 0.69 | 0.41 | 0.26 | 0.38 | 0.73 |
| Styrene (kg) | 0.18 | 0.31 | 0.29 | 0.24 | 0.32 | 0.27 |
| Microstructure modifier (g) | Diglym*3 1.8 | EGDEE*4 1.3 | EGDEE 1.5 | Diglyme 3.0 | Giglyme 2.6 | EGDBE*5 1.3 |
| Polymerization temp. (max.) | | | | | | |
| Synthesis of A block | 70° C. | 60° C. | 55° C. | 60° C. | 55° C. | 50° C. |
| Synthesis of B block | 50° C. | 60° C. | 60° C. | 50° C. | 60° C. | 50° C. |
| Kinds of coupling agent | DMAP*6 | DMAP | DEAP*7 | DEAP | DMAP | DEAP |

TABLE 1-continued

|  |  |  |  |  |  |  |
|---|---|---|---|---|---|---|
| Amount of coupling agent (mmol) | 1.9 | 2.7 | 2.0 | 2.3 | 2.9 | 3.2 |
| Polymer Structure | | | | | | |
| Results of Analysis | | | | | | |
| A Block | | | | | | |
| Styrene cont. (%) | 4 | 2 | 0 | 0 | 0 | 0 |
| 1,2-bond cont. (%) | 27 | 30 | 36 | 36 | 38 | 20 |
| B Block | | | | | | |
| Styrene cont. (%) | 35 | 31 | 41 | 48 | 45 | 27 |
| 1,2-bond cont. (%) | 55 | 36 | 35 | 45 | 41 | 40 |
| A/B ratio | 75/25 | 50/50 | 65/35 | 75/25 | 65/35 | 50/50 |
| Whole copolymer | | | | | | |
| Styrene cont. (%) | 12 | 17 | 14 | 12 | 16 | 14 |
| 1,2-bond cont. (%) | 34 | 33 | 36 | 38 | 39 | 30 |
| Branched polymer content (%) | 48 | 65 | 56 | 62 | 70 | 75 |
| $ML_{1+4}$, 100° C. | 71 | 72 | 75 | 74 | 70 | 69 |

| | Polymer | | | | | |
|---|---|---|---|---|---|---|
| | G Comparative Example | H Comparative Example | I Comparative Example | J Comparative Example | K Comparative Example | L Comparative Example |
| Polymerization Conditions | | | | | | |
| Solvent (kg) | Cyclohexane 10 | n-Hexane 10 | Cyclohexane 10 | n-Hexane 10 | Cyclohexane 10 | n-Hexane 10 |
| A Block | | | | | | |
| Butadiene (kg) | 0.9 | 0.96 | 1.1 | 1.0 | 1.0 | 0.97 |
| Styrene (kg) | 0.1 | 0.04 | 0 | 0 | 0 | 0.03 |
| Microstructure modifier (g) | THF 18.5 | THF 3.5 | THF 75.0 | THF 3.5 | THF 18.5 | THF 20.5 |
| n-BuLi*2 (mmol) | 9.4 | 10.0 | 12.0 | 9.5 | 11.8 | 9.5 |
| B Block | | | | | | |
| Butadiene (kg) | 0.55 | 0.8 | 0.42 | 0.65 | 0.6 | 0.65 |
| Styrene (kg) | 0.45 | 0.2 | 0.48 | 0.35 | 0.4 | 0.35 |
| Microstructure modifier (g) | Diglyme 2.8 | EGDBE 1.0 | EGDEE 4.6 | Diglyme 1.5 | Diglyme 2.0 | Diglyme 3.0 |
| Polymerization temp. (max.) | | | | | | |
| Synthesis of A block | 45° C. | 60° C. | 75° C. | 50° C. | 50° C. | 50° C. |
| Synthesis of B block | 50° C. | 50° C. | 45° C. | 50° C. | 45° C. | 55° C. |
| Kinds of coupling agent | DMAP | DEAP | DMAP | AMAP | $SnCl_4$ | $SiCl_4$ |
| Amount of coupling agent (mmol) | 1.7 | 2.5 | 2.0 | 0.8 | 2.8 | 1.6 |
| Structure | | | | | | |
| Results of Analysis | | | | | | |
| A Block | | | | | | |
| Styrene cont. (%) | 10 | 4 | 0 | 0 | 0 | 3 |
| 1,2-bond cont. (%) | 36 | 20 | 50 | 20 | 40 | 40 |
| B Block | | | | | | |
| Styrene cont. (%) | 45 | 20 | 53 | 35 | 40 | 35 |
| 1,2-bond cont. (%) | 45 | 30 | 52 | 50 | 40 | 56 |
| A/B ratio | 50/50 | 50/50 | 55/45 | 50/50 | 50/50 | 50/50 |
| Whole copolymer | | | | | | |
| Styrene cont. (%) | 28 | 12 | 25 | 18 | 20 | 19 |
| 1,2-bond cont. (%) | 41 | 25 | 51 | 35 | 40 | 48 |
| Branched polymer content (%) | 50 | 56 | 48 | 20 | 51 | 53 |
| $ML_{1+4}$, 100° C. | 78 | 75 | 60 | 70 | 58 | 69 |

Notes
*1 THF: tetrahydrofuran
*2 n-BuLi: n-butyllithium
*3 Diglyme: diethyleneglycol dimethyl ether
*4 EGDEE: ethyleneglycol diethyl ether
*5 EGDBE: ethyleneglycol dibutyl ether
*6 DMAP: dimethyl adipate
*7 DEAP: diethyl adipate Preparation and curing of rubber compositions According to the prescriptions shown in Table 2 and Table 3, kneading was conducted in a BR type Banbary mixer and the obtained composition was cured at 160° C.

The roll processability of the composition and the wet skid, rolling resistance and ice skid characteristics of the cured product were evaluated as follows:

The results are shown in Table 3.

TABLE 2

| | |
|---|---|
| Polymer | 100 parts |
| Aroma oil | 20 parts |
| Stearic acid | 2 parts |
| Sulfur | 1.6 parts |
| Carbon black | 60 parts |
| Zinc oxide | 5 parts |

TABLE 2-continued

| Curing accelerator[1] | 2 parts |
|---|---|

Note
[1]N—Cyclohexyl-2-benzothiazilsulfenamide (1) Rolling Resistance Characteristic The measurement was made using a dynamic solid viscoelastometer made by Toyo Boldwin Co., Ltd. A cured rubber sheet was placed under the conditions of 0.6% in initial elongation, 0.1% in amplitude and 11 Hz in frequency, and the value of loss tangent (tan δ) was measured.

Table 3 shows relative values on the basis of Comparative Example 1. The smaller the value, the better the rolling resistance characteristic.

(2) Wet Skid Characteristic

The wet skid characteristic was measured by employing a portable skid resistance tester made by Stanley Co., Ltd. with respect to a cured rubber sheet having a thickness of 6.5 mm.

An asphalt surface sprayed ith water of 20° C. was employed as a contact road surface.

Table 3 shows relative values on the basis of Comparative Example 1. The larger the value, the better the wet skid characteristic.

(3) Ice Skid Characteristic

The hardness was measured at −20° C. with respect to a cured rubber specimen.

Table 3 shows relative values on the basis of Comparative Example 1. The smaller the value, the better the ice skid characteristic.

(4) Roll Processability The temperature of 6 inch roll was adjusted to 50° C., and the roll spacing was adjusted to 0.7, 1.0, 1.5 or 2.0 mm. A polymer or a polymer mixture was wound round the roll, and its state was observed and estimated according to the following criteria.

| Grade | State of Polymer on Roll |
|---|---|
| 5 | Winding state is very good, sheet skin is smooth and sheet has a tackiness. |
| 4 | Winding state is good, but sheet edge breaking occurs or initial biting is somewhat slow. |
| 3 | Rubber sheet rolled on the roll is lacking in tackiness or "biting" into bank is somewhat bad. |
| 2 | Bagging and sheet breaking occur. |
| 1 | "Biting" into rolls in early stage is bad, and the polymer is not formed into a sheet and does not wind round the roll. |

As shown in Table 3, the rubber compositions of Examples 1 to 8 according to the present invention indicate the features that the rolling resistance is low and the balance between the wet skid characteristic and the ice skid characteristic is excellent, and moreover, the roll processability is excellent.

In contrast, the rubber composition of Comparative Example 2 wherein the styrene content in the block A is outside the scope of the invention, is poor in ice skid characteristic. Also, the rubber compositions of Comparative Examples 3 and 4 wherein the styrene content in the block B is outside the scope of the invention, are poor in wet skid characteristic and ice skid characteristic, respectively.

Also, the composition of Comparative Example 5 wherein the proportion of the branched polymer is low, is somewhat good in total balance of the characteristics desired in the invention, but still unsatisfactory in the light of the demands. Moreover, it is poor in roll processability.

The compositions of Comparative Examples 6 and 7 wherein silicon tetrachloride or tin tetrachloride is used as the coupling agent in the preparation of block copolymers, are poor in ice skid characteristic.

As stated above, according to the present invention, there can be provided a rubber composition suitable as tread rubber of tires of low fuel cost and improved overall in wet skid characteristic, rolling resistance characteristic and ice skid characterisitc as compared with conventional rubber compositions.

In addition to the ingredients used in the Examples, other ingredients can be used in the Examples as set forth in the specification to obtain sustantially the same results.

What we claim is:

1. A rubber composition comprising a rubber component containing at least 20% by weight of a block copolymer, said block copolymer being a branched block copolymer consisting essentially of a block A and a block B, obtained by copolymerization of an aromatic vinyl compound and a conjugated diene compound in the presence of an organolithium initiator in a hydrocarbon solvent and having the following conditions (A) to (E);

(A) the block A is a block of a polymer of which the content of the aromatic vinyl compound is not more than 5% by weight and the 1,2-bonding content in the conjugated diene component is not less than 10% by weight;

(B) the block B is a block of a copolymer of which the content of the aromatic vinyl compound is from 25 to 50% by weight and the 1,2-bonding content in the conjugated diene component is not less than 10% by weight;

(C) the content of block A is from 20 to 80% by weight;

TABLE 3

| | Examples | | | | | | | | Comparative Examples | | | | | | |
|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 |
| Block copolymer | A | B | C | D | E | F | A | B | — | G | H | I | J | K | L |
| Amount (part) | 100 | 100 | 100 | 100 | 100 | 100 | 80 | 80 | — | 100 | 100 | 100 | 100 | 100 | 100 |
| Emulsion SBR*1 (part) | — | — | — | — | — | — | — | — | 100 | — | — | — | — | — | — |
| Natural rubber*2 (part) | — | — | — | — | — | — | 20 | 20 | — | — | — | — | — | — | — |
| Rolling resistance index | 86 | 87 | 87 | 86 | 88 | 86 | 85 | 86 | 100 | 94 | 89 | 95 | 90 | 93 | 91 |
| Wet skid index | 99 | 101 | 100 | 99 | 102 | 100 | 98 | 99 | 100 | 104 | 90 | 105 | 102 | 103 | 104 |
| Ice skid index | 96 | 96 | 95 | 96 | 97 | 94 | 95 | 95 | 100 | 106 | 93 | 107 | 99 | 104 | 105 |
| Roll Processability | 4 | 5 | 4 | 4 | 5 | 5 | 5 | 5 | 5 | 3 | 4 | 4 | 2 | 4 | 4 |

(Notes)
*1Sumitomo SBR ® #1500 made by Sumitomo Chemical Co., Ltd.
*2RSS #3

(D) the average content of the aromatic vinyl compound is from 5 to 30% by weight and the average 1,2-bonding content in the conjugated diene component is from 20 to 60% by weight; and (E) at least 40% by weight of the whole polymer chains is modified with a dicarboxylic acid diester.

2. The composition of claim 1, wherein said block A is a block of a conjugated diene homopolymer having a 1,2-bonding content of 10 to 60% by weight, and said block B has an aromatic vinyl compound content of 30 to 45% by weight and a 1,2-bonding content of 10 to 60% by weight.

3. The composition of claim 1, wherein said dicarboxylic acid diester is at least one member selected from the group consisting of dimethyl adipate, diethyl adipate, di-n-butyl adipate, dimethyl maleate, diethyl maleate, di-n-butyl maleate and di-n-octyl maleate.

4. The composition of claim 1, wherein said aromatic vinyl compound is styrene and said conjugated diene compound is 1,3-butadiene.

5. The composition of claim 1, wherein the Mooney viscosity at 100° C. of said block copolymer is from 20 to 150.

* * * * *

UNITED STATES PATENT AND TRADEMARK OFFICE
CERTIFICATE OF CORRECTION

PATENT NO. : 4,812,527
DATED : March 14, 1989
INVENTOR(S) : TAKAO et al

It is certified that error appears in the above-identified patent and that said Letters Patent is hereby corrected as shown below:

On the cover page, Item [75], lines 1 and 2, "Nabuyuki Yoshida" should read --Nobuyuki Yoshida--.

Signed and Sealed this

Ninth Day of January, 1990

Attest:

JEFFREY M. SAMUELS

Attesting Officer     Acting Commissioner of Patents and Trademarks